United States Patent
Tohill

(10) Patent No.: US 9,657,170 B2
(45) Date of Patent: May 23, 2017

(54) STRAPPING AND METHODS OF MAKING THE SAME

(71) Applicant: Samuel Strapping Systems, Inc., Woodridge, IL (US)

(72) Inventor: Des Tohill, Charlotte, NC (US)

(73) Assignee: Samuel Strapping Systems, Inc., Woodridge, IL (US)

( * ) Notice: Subject to any disclaimer, the term of this patent is extended or adjusted under 35 U.S.C. 154(b) by 0 days.

(21) Appl. No.: 14/352,877

(22) PCT Filed: Oct. 19, 2012

(86) PCT No.: PCT/US2012/060963
§ 371 (c)(1),
(2) Date: Apr. 18, 2014

(87) PCT Pub. No.: WO2013/059555
PCT Pub. Date: Apr. 25, 2013

(65) Prior Publication Data
US 2014/0249275 A1 Sep. 4, 2014

Related U.S. Application Data

(60) Provisional application No. 61/549,659, filed on Oct. 20, 2011.

(51) Int. Cl.
C08L 67/03 (2006.01)
C08L 67/02 (2006.01)
C08L 23/08 (2006.01)
C08L 23/14 (2006.01)

(52) U.S. Cl.
CPC ............... *C08L 67/03* (2013.01); *C08L 67/02* (2013.01); *C08L 23/0869* (2013.01); *C08L 23/0884* (2013.01); *C08L 23/147* (2013.01)

(58) Field of Classification Search
CPC ........ C08L 67/02; C08L 67/03; C08L 23/147; C08L 23/0869; C08L 23/0884
See application file for complete search history.

(56) References Cited

U.S. PATENT DOCUMENTS

| 5,346,737 A | 9/1994 | Takahashi et al. |
| 5,525,391 A | 6/1996 | Dipede et al. |
| 6,210,769 B1 | 4/2001 | DiPede et al. |
| 6,784,245 B2 | 8/2004 | Buhring |
| 7,625,628 B2 | 12/2009 | Rigney et al. |
| 2005/0112372 A1 | 5/2005 | Rolland et al. |
| 2005/0238897 A1* | 10/2005 | Rigney et al. ............... 428/480 |

FOREIGN PATENT DOCUMENTS

| EP | 0 377 513 | 7/1990 |
| WO | WO-03/066704 | 8/2003 |
| WO | WO-2009/120211 | 10/2009 |

OTHER PUBLICATIONS

Odian, G.; Principles of Polymerization, 2004, p. 698.*
Retolaza, A., et al.; Polymer Engineering and Science, 2004, p. 1405-1413.*
Soares, J.B.P., et al.; Polyolefin Reaction Engineering, 2012, p. 1-13.*
Benham, E., et al.; Polyethylene, High Density; Kirk-Othmer Encyclopedia of Chemical Technology, 2005, p. 1-36.*
Lieberman, R., et al.; Polypropylene; Kirk-Othmer Encyclopedia of Chemical Technology, 2000, p. 1-30.*
International Search Report and Written Opinion on PCT/US2012/060963, mailed Mar. 27, 2013.
International Preliminary Report on Patentability for PCT/US2012/060963, mailed May 1, 2014.
Extended Search Report on EP Application 2842045.2, mailed Apr. 15, 2015.

* cited by examiner

*Primary Examiner* — Robert Jones, Jr.
(74) *Attorney, Agent, or Firm* — Foley & Lardner LLP

(57) ABSTRACT

An article includes about 85.5 wt % to about 99.85 wt % of a polyester, and about 0.15 wt % to about 4.5 wt % of a polyolefin co-polymer, where the polyolefin co-polymer is polymerized from monomers including about 10 wt % to about 90 wt % of propylene or one or more (meth)acrylates, and about 10 wt % to about 90 wt % of an olefin other than propylene or a (meth)acrylate, where the article is a strapping article.

13 Claims, 1 Drawing Sheet

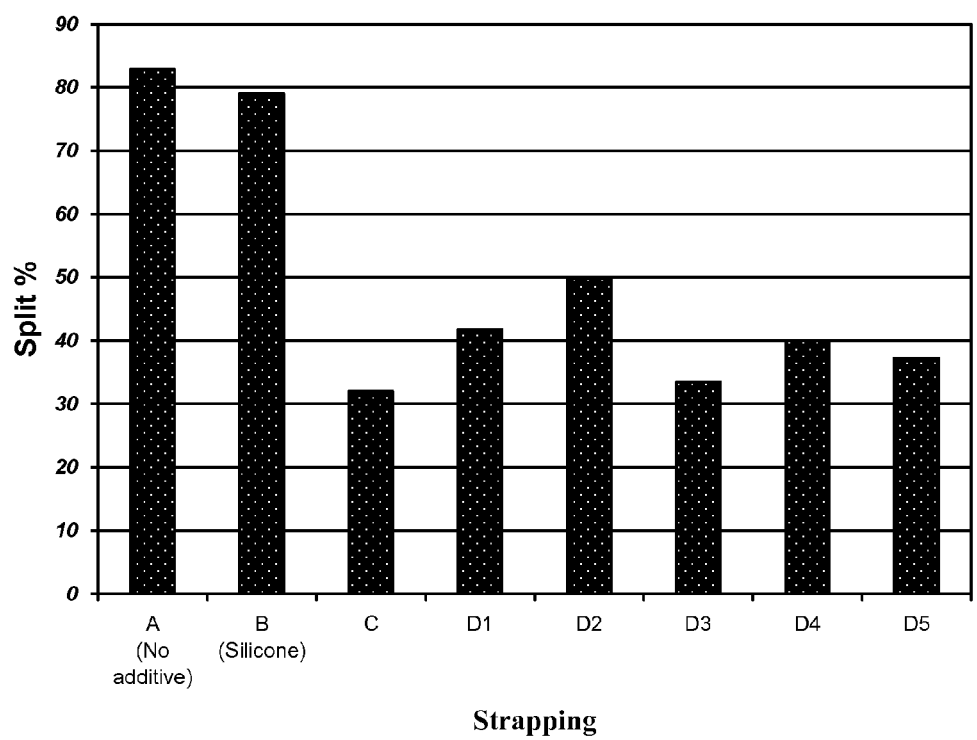

STRAPPING AND METHODS OF MAKING THE SAME

CROSS REFERENCE TO RELATED APPLICATION

This application is a National Stage Application of PCT/US2012/060963, filed Oct. 19, 2012, which claims priority from U.S. Provisional Patent Application No. 61/549,659, filed Oct. 20, 2011, all of which are incorporated hereby by reference in their entirety.

FIELD

Provided herein are strapping compositions made from polyester and a polyolefin co-polymer. More specifically, polyester-based strappings are provided that exhibit commercially useful combinations of physical properties such as seal strength, tension retention, resistance to splitting, and maintenance of polyester's traditional color and translucence. Also provided are methods of making such strapping compositions.

BACKGROUND

Polyester-based strapping is commonly used in the packaging industry to combine, hold, reinforce, or fasten items. Commercial strapping requires a combination of physical properties that can be difficult to incorporate into a single composition in a cost-effective manner. For example, the strapping must have sufficient tensile strength along its longitudinal axis without being susceptible to significant lengthwise splitting. The strapping should maintain an initial tension over a period of time and concede minimal stress relaxation. As used herein stress relaxation is the loss of initial tension. Critically, the strapping must also exhibit sufficient tension retention which keeps the strapping tight around the load, even if the load settles, shifts, or shrinks in size. After being wrapped around an object, the strapping ends are drawn tightly together and fused to form a seal. Typically, the fused seal represents the weakest point of the strapping and, thus, the point most susceptible to failure. Under heavy loads the seal is usually more apt to separate when the strapping is snapped across its width upon being released from the sealing equipment. Thus, great seal strength at the fused ends and a resistance to splitting or breaking after sealing are critical properties of commercial strapping.

Pure polyester strapping is strong and inexpensive, but fails to provide a full range of above-indicated properties. Relatively costly polyolefin co-polymer additives have been added to polyester-based strapping to improve some of these properties, such as resistance to splitting, but these additives may not sufficiently improve other properties such as seal strength and tension retention. Certain additives may also discolor the strapping, (e.g., strapping made from polyethylene terephthalate (PET)), such as by turning it opaque or milky, which can interfere with the operation of the strapping equipment (e.g., optical sensors), and can also be less visually appealing to customers. Consequently, there remains a significant need to identify polyolefin co-polymer additives and new polyester strapping compositions with sufficient seal strength, tension retention, resistance to splitting, and maintenance of PET's traditional color and translucence.

SUMMARY

Applicant has discovered strapping compositions having commercially useful combinations of physical properties such as seal strength, tension retention, resistance to splitting, and maintenance of PET's traditional color and translucence, prepared from a mixture of polymers that includes a polyester and a polyolefin co-polymer.

In one aspect, a strapping composition is provided that includes about 85.5 wt % to about 99.85 wt % of a polyester and about 0.15 wt % to about 4.5 wt % of a polyolefin co-polymer. The polyolefin co-polymer is polymerized from monomers including about 10 wt % to about 90 wt % of propylene or one or more (meth)acrylates and about 10 wt % to about 90 wt % of an olefin other than propylene or a (meth)acrylate. In certain embodiments, the strapping composition further includes about 0.01 wt % to about 10 wt % of a polycarbonate and/or a polyamide such as nylon.

Some of the polyester-based strapping compositions described herein include polyolefin co-polymers that derive, in part, from propylene. In some embodiments, the polyolefin co-polymer is polymerized from monomers including about 26 wt % to about 90 wt % propylene and about 10 wt % to about 74 wt % of the olefin other than propylene or a (meth)acrylate, such as, for example, ethylene. In some embodiments, the polyolefin co-polymer is polymerized from monomers consisting essentially of about 26 wt % to about 39 wt % propylene and about 61 wt % to about 74 wt % of the olefin other than propylene or a (meth)acrylate. The one or more olefins may optionally include a diene. In some embodiments, the polyolefin co-polymer is polymerized from monomers consisting essentially of about 26 wt % to about 39 wt % propylene, about 61 wt % to about 74 wt % of the olefin other than propylene or a (meth)acrylate, and about 0.1 wt % to about 10 wt % of a diene. In certain embodiments, the strapping composition includes about 1.2 wt % to about 2.5 wt % of the polyolefin co-polymer.

Other polyester-based strapping compositions described herein include polyolefin co-polymers that derive, in part, from one or more (meth)acrylates. In some embodiments, the polyolefin co-polymer is polymerized from monomers including about 10 wt % to about 50 wt % of one or more (meth)acrylates, and about 50 wt % to about 90 wt % of the olefin other than propylene or a (meth)acrylate, such as, for example, ethylene. In certain embodiments, the strapping composition includes about 1.2 wt % to about 2.5 wt % of the polyolefin co-polymer.

The polyester-based strapping compositions described herein may include polyolefin co-polymers that include a diene such as ethylidenenorbornene (ENB). In certain embodiments, the polyolefin co-polymer is polymerized from monomers including about 29 wt % propylene, about 70.5 wt % of one or more olefins other than propylene or a (meth)acrylate, and about 0.5 wt % of the diene. In some embodiments, the olefin other than propylene or a (meth)acrylate includes ethylene. In certain embodiments, the polyester includes polyethylene terephthalate, the olefin other than propylene or a (meth)acrylate includes ethylene, and the diene includes ethylidenenorbornene (ENB).

As noted, the strapping compositions described herein are polyester-based. In certain embodiments, the polyester includes polyethylene terephthalate or copolymers of polyethylene terephthalate. In certain embodiments, the polyester includes recycled or reprocessed polyester.

In some aspects, the strapping is contemplated for heavy-duty applications having a width of at least about ⅝ inches (15 mm). For example, heavy-duty strapping with dimensions ⅝"×0.35" generally exhibits a break strength of at least about 1,300 lbs (591 kgs) of load, whereas heavy-duty strapping with dimensions ⅝"×0.40" generally exhibits a break strength of about 1,500 lbs (682 kgs) of load. Heavy-duty polyester strapping is especially prone to splitting, at least in part due to its dimensions (i.e., extra thickness) and the higher tensions it is exposed to during fastening and use. Further, in some applications, heavy-duty strapping must be fitted with "bumpers" that prevent the edges of the tightly wrapped strapping from digging into and damaging fastened goods such as lumber. It is thus contemplated that heavy-duty strapping with a width of at least about 5/8 inches (15 mm) and, optionally, a thickness of about 0.018 inches (0.46 mm) to about 0.035 inches (0.70 mm) or, alternatively, exhibiting a break strength of at least about 1,300 lbs (591 kgs) of load, can be prepared from the compositions described herein to have a reduced incidence of splitting. Reduced splitting can allow the strapping to be produced relatively thin and wide. In certain embodiments, heavy-duty strapping is greater than 1 inch (25.4 mm) wide or, in other embodiments, greater than 1¼ inches (31.8 mm) wide which, in turn, can reduce the need to use protective bumpers in heavy-duty applications.

In another aspect, provided herein is a method of manufacturing an article, where the article is a strapping composition. The method of manufacturing the strapping composition includes the steps of forming a mixture, heating the mixture, and extruding the heated mixture to form the strapping, where the mixture includes about 85.5 wt % to about 99.85 wt % of a polyester; and about 0.15 wt % to about 4.5 wt % of a polyolefin co-polymer, where the polyolefin co-polymer is polymerized from monomers including about 10 wt % to about 90 wt % of propylene or one or more (meth)acrylates, and about 10 wt % to about 90 wt % of an olefin other than propylene or a (meth)acrylate.

In certain embodiments of the method, the mixture that is formed further includes about 0.01 wt % to about 10 wt % of a polycarbonate and/or polyamide such as nylon. In some embodiments, the one or more olefins other than propylene include a diene, such as ethylidenenorbornene (ENB).

In certain embodiments of the method, the polyester, such as PET, that is included in the mixture has an intrinsic viscosity of about 0.70 dl/g to about 0.84 dl/g. In other embodiments, the polyester, such as PET, has an intrinsic viscosity of about 0.78 dl/g to about 0.82 dl/g. In yet other embodiments, the polyester, such as PET, has an intrinsic viscosity of about 0.76 dl/g to about 0.80 dl/g, or about 0.74 dl/g to about 0.78 dl/g. In certain embodiments, the PET includes recycled PET. In other embodiments, the PET includes reprocessed PET.

In certain embodiments of the method, the mixture is extruded from a single-screw extruder. In other embodiments, the method of manufacturing a strapping composition further includes the step of stretching the strapping about 3 to about 7 times an initial, unstretched length of the strapping.

BRIEF DESCRIPTION OF THE DRAWINGS

FIG. 1 graphically illustrates the split testing results of Table 5 by displaying the percentage of straps that were split relative to the total number of split tests that were run on each strap. The compositions of straps A, B, C, and D1-D5 are described in Table 5.

DETAILED DESCRIPTION

The illustrative embodiments described in the detailed description, drawings, and claims are not meant to be limiting. Other embodiments may be utilized, and other changes may be made, without departing from the spirit or scope of the subject matter presented here.

The technology is described herein using several definitions, as set forth throughout the specification.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

As used herein, the term (meth)acrylic monomer refers to acrylic or methacrylic acid, esters of acrylic or methacrylic acid, and salts, amides, and other suitable derivatives of acrylic or methacrylic acid, and mixtures thereof. Examples of suitable acrylic monomers include, without limitation, the following methacrylate esters: methyl methacrylate, ethyl methacrylate, n-propyl methacrylate, n-butyl methacrylate (BMA), isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylamino ethyl methacrylate, N,N-diethylaminoethyl methacrylate, t-butylaminoethyl methacrylate, 2-sulfoethyl methacrylate, trifluoroethyl methacrylate, glycidyl methacrylate (GMA), benzyl methacrylate, allyl methacrylate, 2-n-butoxyethyl methacrylate, 2-chloroethyl methacrylate, sec-butyl-methacrylate, tert-butyl methacrylate, 2-ethylbutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octyl-methacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate. Example of suitable acrylate esters include, without limitation, methyl acrylate, ethyl acrylate, n-propyl acrylate, isopropyl acrylate, n-butyl acrylate (BA), n-decyl acrylate, isobutyl acrylate, n-amyl acrylate, n-hexyl acrylate, isoamyl acrylate, 2-hydroxyethyl acrylate, 2-hydroxypropyl acrylate, N,N-dimethylaminoethyl acrylate, N,N-diethylaminoethyl acrylate, t-butylaminoethyl acrylate, 2-sulfoethyl acrylate, trifluoroethyl acrylate, glycidyl acrylate, benzyl acrylate, allyl acrylate, 2-n-butoxyethyl acrylate, 2-chloroethyl acrylate, sec-butyl-acrylate, tert-butyl acrylate, 2-ethylbutyl acrylate, cinnamyl acrylate, crotyl acrylate, cyclohexyl acrylate, cyclopentyl acrylate, 2-ethoxyethyl acrylate, furfuryl acrylate, hexafluoroisopropyl acrylate, methallyl acrylate, 3-methoxybutyl acrylate, 2-methoxybutyl acrylate, 2-nitro-2-methylpropyl acrylate, n-octylacrylate, 2-ethylhexyl acrylate, 2-phenoxyethyl acrylate, 2-phenylethyl acrylate, phenyl acrylate, propargyl acrylate, tetrahydrofurfuryl acrylate and tetrahydropyranyl acrylate.

As used herein, the term "co-polymer" refers to polymers prepared from more than one distinct monomer. As used herein, a co-polymer may be prepared from, for example, two, three, four, five, etc., distinct monomers.

In a first aspect, strapping compositions are provided that exhibit useful combinations of physical properties such as seal strength, tension retention, resistance to splitting, and maintenance of the polyester strapping's traditional color and translucence. A combination of physical properties is required of commercially useful strappings. First, the strapping should be strong. Specifically, it should have sufficient tensile strength along its longitudinal axis to withstand heavy loads without breaking. Further, the strapping should not be too brittle. Brittle strapping has a tendency to split along its length. The strapping should exhibit sufficient seal strength as the strapping is tightly wrapped around an object and fused together at the ends to form a seal. This seal may have to withstand heavy loads without being pulled apart. Also, the strapping should exhibit flexibility, or tension retention, to remain tight around the wrapped load, even if the load settles, shifts, or shrinks in size. Finally, for some customers or for certain equipment, the strapping color can be important, particularly the strapping's translucence to light.

Combinations of the above-described physical properties can be difficult to incorporate into a single strapping composition in a cost-effective manner. Relatively costly polyolefin co-polymer additives have been added to polyester-based strapping to improve some, but not all, of these properties. Provided are polyolefin co-polymer additives which have been identified that, when added to polyester, provide strapping compositions with sufficient combinations of physical properties such as seal strength, tension retention, reduced splitting and/or maintenance of the strapping's translucence to light.

In one aspect, a strapping composition is provided that includes about 85.5 wt % to about 99.85 wt % of a polyester and about 0.15 wt % to about 4.5 wt % of a polyolefin co-polymer. The polyolefin co-polymer may be polymerized from monomers including about 10 wt % to about 90 wt % of propylene or one or more (meth)acrylates and about 10 wt % to about 90 wt % of an olefin other than propylene or a (meth)acrylate.

Some of the polyester-based strapping compositions described herein include polyolefin co-polymers that derive, in part, from propylene. Thus, in some embodiments, the polyolefin co-polymer is polymerized from monomers including about 26 wt % to about 90 wt % propylene and about 10 wt % to about 74 wt % of the olefin other than propylene or a (meth)acrylate. In some embodiments, the polyolefin co-polymer is polymerized from monomers consisting essentially of about 26 wt % to about 39 wt % propylene and about 61 wt % to about 74 wt % of the olefin other than propylene or a (meth)acrylate.

Some of the polyester-based strapping compositions described herein include polyolefin co-polymers that additionally derive, in part, from a diene. For example, in some embodiments, the polyolefin co-polymer includes one or more olefins other than propylene or a (meth)acrylate, such as ethylene and a diene. In some embodiments, the polyolefin co-polymer is polymerized from monomers consisting essentially of about 26 wt % to about 39 wt % propylene; about 61 wt % to about 74 wt % of the olefin other than propylene or a (meth)acrylate and about 0.1 wt % to about 10 wt % of a diene. In any of the embodiments described herein, the diene is ethylidene norbornene (ENB), norbornadiene, oxanorbornadiene, dicyclopentadiene, an (alpha, omega)-diene, or combinations thereof.

In certain embodiments, the strapping includes a polyolefin co-polymer, where the polyolefin co-polymer is polymerized from monomers including propylene, ethylene, and ENB. In some embodiments, the strapping includes a polyolefin co-polymer, where the polyolefin co-polymer is polymerized from monomers including about 27 wt % to about 31 wt % propylene, about 68 wt % to about 73 wt % of the olefin other than propylene or a (meth)acrylate, and about 0.1 wt % to about 5 wt % of the diene. In some embodiments, the polyolefin co-polymer is polymerized from monomers including about 29 wt % propylene, about 70.5 wt % of the olefin other than propylene or a (meth)acrylate, and about 0.5 wt % of the diene.

In certain embodiments, the strapping is prepared from a polyolefin co-polymer that is polymerized from propylene, ethylene, and ENB as set forth below in Table 1.

TABLE 1

Exemplary polyolefin co-polymers

| Batch | Propylene wt % | Ethylene wt % | ENB wt % |
|---|---|---|---|
| a | 57.3 | 42 | 0.7 |
| b | 43.2 | 55 | 1.8 |
| c | 29.4 | 70 | 0.6 |
| d | 29 | 70.5 | 0.5 |
| e | 29.5 | 70 | 0.5 |
| f | 30.8 | 67 | 2.2 |
| h | 45.1 | 50 | 4.9 |
| i | 40.1 | 55 | 4.9 |
| j | 25.1 | 70 | 4.9 |
| k | 28.1 | 67 | 4.9 |
| n | 27.1 | 68 | 4.9 |
| p | 42.5 | 50 | 7.5 |

In other embodiments, the strapping includes a polyolefin co-polymer, where the polyolefin co-polymer is polymerized from monomers including propylene, ethylene, or styrene, or mixtures thereof, and one or more dienes. In certain embodiments, the diene is ethylidene norbornene (ENB). In other embodiments, the polyolefin co-polymer is polymerized from mixtures of propylene-ethylene-diene or styrene-butadiene.

Where the strapping composition include a diene, the amount of diene added to the polyolefin co-polymer of the polyester-based strapping compositions can and will vary. In certain embodiments, the polyolefin co-polymer is polymerized from monomers including about 0.2 wt % to about 0.5 wt % of one or more dienes. In certain embodiments, the polyolefin co-polymer is polymerized from monomers including about 0.5 wt % to about 1.0 wt % of one or more dienes. In certain embodiments, the polyolefin co-polymer is polymerized from monomers including about 1.0 wt % to about 1.2 wt % of one or more dienes. In certain embodiments, the polyolefin co-polymer is polymerized from monomers including about 1.2 wt % to about 1.4 wt % of one or more dienes. In certain embodiments, the polyolefin co-polymer is polymerized from monomers including about 1.4 wt % to about 1.6 wt % of one or more dienes. In certain embodiments, the polyolefin co-polymer is polymerized from monomers including about 1.6 wt % to about 1.8 wt % of one or more dienes. In certain embodiments, the polyolefin co-polymer is polymerized from monomers including about 1.8 wt % to about 2.0 wt % of one or more dienes. In certain embodiments, the polyolefin co-polymer is polymerized from monomers including about 2.0 wt % to about 3.0 wt % of one or more dienes. In certain embodiments, the polyolefin co-polymer is polymerized from monomers including about 3.0 wt % to about 4.0 wt % of one or more dienes. In certain embodiments, the polyolefin co-polymer is polymerized from monomers including about 4.0 wt % to about 8.0 wt % of one or more dienes. In certain embodiments, the polyolefin co-polymer is polymerized from monomers including about 8.0 wt % to about 15.0 wt % of one or more dienes.

Some of the polyester-based strapping compositions described herein include propylene-based polyolefin co-polymers that derive, in part, from one or more (meth)acrylates. In some embodiments, the polyolefin co-polymer is polymerized from monomers including: about 10 wt % to about 50 wt % of one or more (meth)acrylates; and about 50 wt % to about 90 wt % of the olefin other than propylene or a (meth)acrylate. In some embodiments, the polyolefin co-polymer is polymerized from monomers consisting essentially of: about 10 wt % to about 50 wt % of one or more (meth)acrylates; and about 50 wt % to about 90 wt % of the olefin other than propylene or a (meth)acrylate.

In some embodiments, the polyolefin co-polymer is polymerized from monomers including about 10 wt % to about 20 wt % one or more (meth)acrylates and about 80 wt % to about 90 wt % ethylene. In some embodiments, the polyolefin co-polymer is polymerized from monomers including about 21 wt % to about 30 wt % one or more (meth)acrylates and about 70 wt % to about 79 wt % ethylene. In some embodiments, the polyolefin co-polymer is polymerized from monomers including about 31 wt % to about 40 wt % one or more (meth)acrylates and about 60 wt % to about 69 wt % ethylene. In some embodiments, the polyolefin co-polymer is polymerized from monomers including about 15 wt % to about 40 wt % one or more (meth)acrylates and about 60 wt % to about 85 wt % ethylene.

In some embodiments, the strapping composition includes a polyolefin co-polymer, the polyolefin co-polymer includes one or more (meth)acrylates, and the (meth)acrylates include butyl acrylate, methyl acrylate, glycidyl (meth)acrylate, methyl (meth)acrylate, or a combination of any two or more thereof.

In certain embodiments, the strapping composition includes a polyolefin co-polymer, and the polyolefin co-polymer includes an acrylate-comprising Lotryl® co-polymer as shown in Table 2. Lotryl® co-polymers are supplied by Arkema Inc., of Colombes, France. In certain embodiments, the polyolefin co-polymer includes Lotryl® 17 BA 04 (deriving about 16% to about 19% butyl acrylate and about 81% to about 84% ethylene), Lotryl® 17 BA 07 (deriving about 16% to about 19% butyl acrylate and about 81% to about 84% ethylene), Lotryl® 28 BA 175 (deriving about 26% to about 30% butyl acrylate and about 70% to about 74% ethylene), Lotryl® 30 BA 02 (deriving about 27% to about 32% butyl acrylate and about 68% to about 73% ethylene), Lotryl® 35 BA 40 (deriving about 32% to about 37% butyl acrylate and about 63% to about 78% ethylene) or Lotryl® 35 BA 320 (deriving about 32% to about 37% butyl acrylate and about 63% to about 78% ethylene). In some embodiments, the polyolefin co-polymer includes Lotryl® 30 BA 02. In other embodiments, the polyolefin co-polymer includes Lotryl® 35 BA 40.

In some embodiments, the polyolefin co-polymer includes one or more (meth)acrylates such as butyl acrylate. In some embodiments, the one or more (meth)acrylates consists essentially of butyl acrylate. In some embodiments, the polyolefin co-polymer is Lotryl® 17 BA 04, Lotryl® 17 BA 07, Lotryl® 28 BA 175, Lotryl® 30 BA 02, Lotryl® 35 BA 40, or Lotryl® 35 BA 320. In some embodiments, the polyolefin co-polymer is Lotryl® 30 BA 02 or Lotryl® 35 BA 40.

In other embodiments, the polyolefin co-polymer includes Lotryl® 18 MA 02 (deriving about 17% to about 20% methyl acrylate and about 80% to about 83% ethylene), Lotryl® 20 MA 08 (deriving about 19% to about 22% methyl acrylate and about 78% to about 81% ethylene), Lotryl® 24 MA 005 (deriving about 23% to about 26% methyl acrylate and about 74% to about 77% ethylene), Lotryl® 24 MA 02 (deriving about 23% to about 26% methyl acrylate and about 74% to about 77% ethylene) or Lotryl® 29 MA 03 (deriving about 27% to about 31% methyl acrylate and about 69% to about 73% ethylene).

In some embodiments, the polyolefin co-polymer includes one or more (meth)acrylates such as methyl acrylate. In some embodiments, the one or more (meth)acrylates consists essentially of methyl acrylate. In some embodiments, the polyolefin co-polymer is Lotryl® 18 MA 02, Lotryl® 20 MA 08, Lotryl® 24 MA 005, Lotryl® 24 MA 02, or Lotryl® 29 MA 03.

TABLE 2

Exemplary Lotryl ® polyolefin/acrylate co-polymers

| | Lotryl ® Grade | Acrylate (%) | Melt Index (g/10 mn) | Melting Point (C. °) | Tensile strength at break (MPa) | Elongation at break (%) |
|---|---|---|---|---|---|---|
| Butyl Acrylate (BA) Co-Polymers | 17 BA 04 | 16-19 | 3.5-4.5 | 93 | 15 | 700 |
| | 17 BA 07 | 16-19 | 6.5-8.0 | 89 | 14 | 700 |
| | 28 BA 175 | 26-30 | 150-200 | 80 | 3 | 750 |
| | 30 BA 02 | 27-32 | 1.5-2.5 | 78 | 6 | 850 |
| | 35 BA 40 | 32-37 | 35-45 | 66 | 2 | 300 |
| | 35 BA 320 | 32-37 | 260-350 | 65 | 1.5 | 200 |
| Methyl Acrylate (BA) Co-Polymers | 18 MA 02 | 17-20 | 2-3 | 83 | 13 | 700 |
| | 20 MA 08 | 19-22 | 7-9 | 80 | 9 | 800 |
| | 24 MA 005 | 23-26 | 0.4-0.6 | 72 | 17 | 750 |
| | 24 MA 02 | 23-26 | 1-3 | 68 | 9 | 750 |
| | 29 MA 03 | 27-31 | 2.0-3.5 | 61 | 6 | 900 |

In certain embodiments, the polyolefin co-polymer includes an acrylate-comprising Lotader® co-polymer supplied by Arkema Inc., of Colombes, France. Lotryl® co-polymers include Lotader® MAH (derived from ethylene, methyl acrylate, ethyl acrylate, butyl acrylate, and maleic anhydride) Maleic Anhydride) and Lotader® GMA (derived from ethylene, methyl acrylate, and glycidyl methacrylate). In certain embodiments, the polyolefin co-polymer includes a Lotader® MAH terpolymer as shown in Table 3.

TABLE 3

Exemplary Lotader ® MAH terpolymers

| Lotader ® Grade | Acrylic Ester | Acrylic Ester (%) | Melt Index (g/10 mn) | Maleic Anhydride (%) | Melting Point (° C.) | Tensile Strength at Break (MPa) | Elongation at break (%) |
|---|---|---|---|---|---|---|---|
| 3210 | BA | 6 | 5 | 3.1 | 107 | 12 | 600 |
| 4210 | BA | 6.5 | 9 | 3.6 | 105 | 10 | 650 |
| 6200 | EA | 6.5 | 40 | 2.8 | 102 | 6 | 600 |
| 8200 | EA | 6.5 | 200 | 2.8 | 100 | 6 | 400 |
| LX 4110 | EA | 5 | 5 | 3 | 105 | 11 | 650 |
| TX 8030 | EA | 13 | 3 | 2.8 | 95 | 12 | 700 |
| HX 8290 | EA | 17 | 70 | 2.8 | 85 | 6 | 500 |
| 3410 | BA | 17 | 5 | 3.1 | 89 | 8 | 700 |

TABLE 3-continued

Exemplary Lotader ® MAH terpolymers

| Lotader ® Grade | Acrylic Ester | Acrylic Ester (%) | Melt Index (g/10 mn) | Maleic Anhydride (%) | Melting Point (° C.) | Tensile Strength at Break (MPa) | Elongation at break (%) |
|---|---|---|---|---|---|---|---|
| 4503 | MA | 19 | 8 | 0.3 | 80 | 9 | 750 |
| 5500 | EA | 20 | 20 | 2.8 | 80 | 10 | 700 |
| 4700 | EA | 29 | 7 | 1.3 | 65 | 5 | 800 |
| 4720 | EA | 29 | 7 | 0.3 | 65 | 6 | 800 |

In some embodiments, the one or more (meth)acrylates includes methyl acrylate and glycidyl (meth)acrylate. In some embodiments, the polyolefin co-polymer is Lotader® GMA AX 8900, as shown in Table 4.

TABLE 4

An exemplary Lotader ® GMA terpolymer

| Lotader ® Grades | Acrylic Ester | Acrylic Ester (%) | Melt Index (g/10 mn) | Glycidyl Methacrylate (%) | Melting Point (° C.) | Tensile Strength at Break (MPa) | Elongation at break (%) |
|---|---|---|---|---|---|---|---|
| AX 8900 | MA | 24 | 6 | 8 | 65 | 4 | 1100 |

In Tables 2-4, "MA" refers to methyl acrylate, "EA" refers to ethyl acrylate, and "BA" refers to butyl acrylate.

The polyester-based strapping compositions described herein can be made, in part, from a variety of polyesters. Non-limiting polyesters include aromatic polyesters, such as polyethylene terephthalate (PET), polypropylene terephthalate, polybutylene terephthalate, polyethylene naphthalate, polybutylene naphthalate, polytetramethylene terephthalate, polycyclohexanedimethylene terephthalate, polyethylene isophthalate, and the like.

The polyester used in the polyester-based strapping compositions described herein may be prepared from a dicarboxylic acid component and a diol component. Representative dicarboxylic acids include terephthalic acid, isophthalic acid, 2,6-naphthalenedicarboxylic acid, 4,4'-diphenyldicarboxylic acid, adipic acid, and sebacic acid. Representative diols include ethylene glycol, 1,4-butanediol, 1,4-cyclohexane dimethanol, and 1,6-hexanediol. The polyester includes homo- or co-polyesters.

The polyester may be prepared by copolymerizing a polyester constituent and another acid component and/or a glycol component (e.g., an acid component such as terephthalic acid, isophthalic acid, adipic acid, sebacic acid, glutaric acid, diphenylmethane dicarboxylic acid, dimer acid, or the like, and a glycol component such as ethylene glycol, diethylene glycol, hexamethylene glycol, bisphenol A, neopentyl glycol alkylene oxide adduct, or the like); degradable aliphatic polyesters, such as the polyhydroxyalkanoates (e.g., polyhydroxybutyrate, polyhydroxyvalerate, or polyhydroxybutyrate-co-hydroxyvalerate (PHBV)), polycaprolactone (PCL), polybutylene succinate, polyethylene succinate, polylactic acid (PLA), polymalic acid, polyglycolic acid, polylactide-co-glycolide, polydioxanone, poly(2-oxetanone), polyesteramide (PEA) and the like. Further polyesters include aromatic polyester/polyether block copolymers, aromatic polyester/polylactone block copolymers, polyarylate, and the like. In certain embodiments, the polyester of the strapping composition is a blend of any two or more such polyesters, or a co-polymer of any two or more such polyesters. In other embodiments, the polyester includes polyethylene terephthalate, polybutylene terephthalate, polyethylene naphthalate, polyethylene isophthalate, or combinations thereof. In certain embodiments, the polyester includes polyethylene terephthalate and its copolymers. In some embodiments, the polyester includes a recycled or a reprocessed polyester.

The polyester may be a reprocessed or a recycled polyester. As used herein, the term reprocessed polyester means a polyester polymer reclaimed from a production facility originally scrapped for not meeting quality control or specification targets. Amongst these can be included polyester products out of specification from compounding, extrusion, or molding start-up and shut down production and/or polyester products from general production out of specification or otherwise not meeting product quality specifications. Also, included in the definition of reprocessed polyester are polyester products processed to final use form but not meeting product specifications, such as polyester product out of caliber or dimensions, color, shape, or polyester waste process material. As used herein, the term recycled polyester means a polyester-based plastic reclaimed a posteriori from its final use from diverse sources, including, but not limited to, scrap from water bottles, detergent bottles, and other consumer products. Thus, the strapping compositions and processes of preparing the strapping compositions may be considered to be environmentally friendly, in that they minimize waste by not requiring the use of virgin polyesters.

The strapping composition may include about 85.5 wt % to about 99.85 wt % of a polyester. In certain embodiments, the strapping composition includes about 85.5 wt % to about 90.0 wt % of a polyester. In certain embodiments, the strapping composition includes about 90.0 wt % to about 95.0 wt % of a polyester. In certain embodiments, the strapping composition includes about 95.0 wt % to about 96.0 wt % of a polyester. In certain embodiments, the strapping includes about 96.0 wt % to about 97.0 wt % of a polyester. In certain embodiments, the strapping composition includes about 97.0 wt % to about 98.0 wt % of a polyester. In certain embodiments, the strapping composition includes about 98.0 wt % to about 99.0 wt % of a polyester. In certain embodiments, the strapping composition includes about 99.0 wt % to about 99.85 wt % of a polyester.

The strapping compositions described herein may further include polyamide or polycarbonate additives. For example, in an additional aspect, a strapping composition is provided that includes about 85.5 wt % to about 99.85 wt % of a polyester; and about 0.15 wt % to about 4.5 wt % of a polyolefin co-polymer; where the polyolefin co-polymer is polymerized from monomers including about 10 wt % to about 90 wt % of propylene or one or more (meth)acrylates; and about 10 wt % to about 90 wt % of an olefin other than propylene or a (meth)acrylate; where the article optionally includes about 0.01 wt % to about 10 wt % of a polyamide or a polycarbonate. In some embodiments, the strapping composition includes a polyamide, where the polyamide includes nylon.

In one embodiment, the strapping compositions include a polyamide, where the polyamide is produced by condensation of a dicarboxylic acid with a diamine, by polymerizing a cyclic lactam, or by co-polymerizing a cyclic lactam with a dicarboxylic acid/diamine salt. The polyamides include polyamide elastomer resins. Suitable polyamide elastomer resins include a nylon, such as nylon 6, nylon 6-6, nylon 6-10, nylon 11, nylon 12, and co-polymers and blends of any two or more such polyamides.

Where the strapping composition includes a polyamide and/or polycarbonate, it may include about 0.1 wt % to about 0.5 wt % of a polycarbonate and/or polyamide. In certain embodiments, the strapping composition includes about 0.5 wt % to about 1.0 wt % of a polyamide and/or polycarbonate. In certain embodiments, the strapping composition includes about 1.0 wt % to about 3.0 wt % of a polyamide and/or polycarbonate. In certain embodiments, the strapping composition includes about 3.0 wt % to about 5.0 wt % of a polyamide and/or polycarbonate. In certain embodiments, the strapping composition includes about 5.0 wt % to about 7.0 wt % of a polyamide and/or polycarbonate. In certain embodiments, the strapping composition includes about 7.0 wt % to about 10.0 wt % of a polyamide and/or polycarbonate. In certain of the above embodiments, the strapping composition includes polyamide. In certain of the above embodiments, the strapping composition includes polycarbonate. In certain embodiments, the polyester includes polyethylene terephthalate and the polyamide includes nylon.

The strapping compositions may also include polyolefin co-polymers, where the polyolefin co-polymers are polymerized from olefin monomers other than propylene or a (meth)acrylate, such as, for example, ethylene, 1-butene, 1-hexene, 1-octene, 1-decene, or styrene. In certain embodiments, the polyolefin co-polymers are polymerized from olefin monomers other than propylene or a (meth)acrylate, such as ethylene. In certain embodiments, the ethylene is polymerized to form linear low density polyethylene. In certain embodiments, the ethylene is polymerized to form branched low density polyethylene. As used herein, "low density polyethylene" has a specific gravity of about 0.861 to about 0.94. In certain embodiments, the polyolefin co-polymer is polymerized from propylene, ethylene, styrene, butadiene, or mixtures or copolymers thereof, such as propylene-ethylene, styrene-ethylene-propylene, or styrene-ethylene-butene-styrene.

In another aspect, the olefin other than propylene or a (meth)acrylate, such as ethylene, is present about 10 wt % to about 30 wt %. In some embodiments, the olefin other than propylene or a (meth)acrylate, such as ethylene, is present about 30 wt % to about 60 wt %. In some embodiments, the olefin other than propylene or a (meth)acrylate, such as ethylene, is present from 61 wt % to 74 wt %.

It has been found that, in addition to the identity of the polyolefin co-polymer, the wt % of polyolefin co-polymer can impact certain commercially relevant properties of the strapping composition including tension retention, seal strength, resistance to splitting, and color or opacity. In certain embodiments, the strapping composition includes about 0.15 wt % to about 0.5 wt % of the polyolefin co-polymer. In certain embodiments, the strapping composition includes about 0.5 wt % to about 1.0 wt % of the polyolefin co-polymer. In another aspect, the strapping composition includes about 1.0 wt % to about 1.2 wt % of the polyolefin co-polymer. In some embodiments, the strapping composition includes about 1.2 wt % to about 1.4 wt % of the polyolefin co-polymer. In certain embodiments, the strapping composition includes about 1.4 wt % to about 1.6 wt % of the polyolefin co-polymer. In other embodiments, the strapping composition includes about 1.6 wt % to about 1.8 wt % of the polyolefin co-polymer. In certain embodiments, the strapping composition includes about 1.8 wt % to about 2.0 wt % of the polyolefin co-polymer. In certain embodiments, the strapping composition includes about 2.0 wt % to about 2.5 wt % of the polyolefin co-polymer. In certain embodiments, the strapping composition includes about 2.5 wt % to about 3.0 wt % of the polyolefin co-polymer. In certain embodiments, the strapping composition includes about 3.0 wt % to about 3.5 wt % of the polyolefin co-polymer. In certain embodiments, the strapping composition includes about 3.5 wt % to about 4.0 wt % of the polyolefin co-polymer. In certain embodiments, the strapping composition includes about 4.0 wt % to about 4.5 wt % of the polyolefin co-polymer.

Melt flow index (MFI) is a measure of the ease of flow of the melt of a thermoplastic polymer. It is defined as the mass of polymer, in grams, flowing in ten minutes through a capillary of a specific diameter and length by a pressure applied via prescribed alternative gravimetric weights for alternative prescribed temperatures. The method is described by American Society for Testing (ASTM) D1238 and ISO 1133. Melt flow rate is an indirect measure of molecular weight, with high melt flow rate corresponding to low molecular weight. At the same time, melt flow rate is a measure of the ability of the material's melt to flow under pressure. Melt flow rate is inversely proportional to viscosity of the melt at the conditions of the test, though it should be borne in mind that the viscosity for any such material depends on the applied force.

In some embodiments, the polyolefin co-polymer has a melt temperature of about 60° C. to about 85° C. In some embodiments, the polyolefin co-polymer has a melt temperature of about 65° C. to about 80° C.

In certain embodiments, the polyolefin co-polymer has a MFI of between about 0.1 g/10 min and about 5.0 g/10 min, as determined through a standard die (2.095×8 mm, at 230° C., under 2.16 kg of load) in accordance with the methods described under ASTM D1238. In other embodiments, the polyolefin co-polymer has a MFI of between about 0.1 g/10 min and about 2.0 g/10 min. In certain embodiments, the polyolefin co-polymer has a MFI of between about 0.1 g/10 min and about 1.0 g/10 min. In certain embodiments, the polyolefin co-polymer has a MFI of between about 0.4 g/10 min and 0.6 g/10 min. In certain embodiments, the polyolefin co-polymer has a MFI of about 0.5 g/10 min. In certain embodiments, the polyolefin co-polymer has a MFI of 0.49 g/10 min.

In certain embodiments, the strapping compositions are prepared from a polymer blend of polyester and polyolefin co-polymers, where the polyester, such as PET, has an intrinsic viscosity below 0.86 dl/g, prior to processing. In certain embodiments, the polyester, such as PET, has an intrinsic viscosity at or below 0.82 dl/g. In some embodiments, the polyester, such as PET, has an intrinsic viscosity of between about 0.70 dl/g and about 0.90 dl/g. In some embodiments, the polyester has an intrinsic viscosity of about 0.70 dl/g to about 0.84 dl/g. In some embodiments, the polyester, such as PET, has an intrinsic viscosity of between about 0.75 dl/g and about 0.85 dl/g. In some embodiments, the polyester, such as PET, has an intrinsic viscosity of between about 0.78 dl/g and about 0.82 dl/g. In some embodiments, the polyester has an intrinsic viscosity of about 0.79 dl/g to about 0.82 dl/g. In yet other embodiments, the polyester, such as PET, has an intrinsic viscosity of about 0.76 dl/g to about 0.80 dl/g, or about 0.74 dl/g to about 0.78 dl/g. The above viscosity values refer to the viscosity of the polyester prior to the extrusion step that processes the polyester-based composition into strapping. In certain embodiments, the intrinsic viscosity of the above-described polymer blends can drop by about 0.1 dl/g or 0.2 dl/g after processing at elevated temperatures, such as through typical extrusion operations.

In some embodiments, the article has an intrinsic viscosity of about 0.60 dl/g to about 0.80 dl/g. In some embodiments, the article has an intrinsic viscosity of about 0.65 dl/g to about 0.72 dl/g.

Heavy-duty polyester strapping is especially prone to splitting. In certain embodiments, polymer blends of polyester and polyolefin co-polymers, where the polyester has an intrinsic viscosity below 0.86 dl/g, have been incorporated into heavy-duty strapping having a width of at least about ⅝ inches (15 mm) and, optionally, a thickness of at least about 0.019 inches (0.48 mm) or, alternatively, exhibiting a break strength of at least about 1,300 lbs (591 kgs) of load. Heavy-duty strapping can be prepared from a blend of polyester and polyolefin co-polymers, where the polyester has an intrinsic viscosity below 0.86 dl/g. The resulting heavy-duty strapping exhibits resistance to splitting, increased tension retention, increased seal strength, and/or and maintenance of polyester's traditional color and translucence. In certain embodiments, heavy-duty strapping is prepared from polymer blends of polyester and polyolefin co-polymers, where the polyester has an intrinsic viscosity from between about 0.70 dl/g to about 0.85 dl/g, or, for example, 0.70 dl/g, 0.71 dl/g, 0.72 dl/g, 0.73 dl/g, 0.74 dl/g, 0.75 dl/g, 0.76 dl/g, 0.77 dl/g, 0.78 dl/g, 0.79 dl/g, 0.80 dl/g, 0.81 dl/g, 0.82 dl/g, 0.83 dl/g, 0.84 dl/g, and 0.85 dl/g. It is thus contemplated that heavy-duty strapping can be prepared from the compositions described herein to have a reduced incidence of splitting. Reduced splitting can allow the strapping to be produced relatively thin and wide, for example, at least about 1 inch wide, or, in certain embodiments, at least about 1¼ inches wide, which in turn can reduce the need to use protective bumpers in heavy-duty applications.

In certain embodiments, polymer blends of polyester and polyolefin co-polymers, where the polyester has an intrinsic viscosity below 0.86 dl/g, have been incorporated into light-duty strapping (i.e., strapping having a width of less than ⅝ inches (15 mm) or, alternatively, exhibiting a break strength of less than about 1,300 lbs (591 kgs) of load. Light-duty polyester strapping, while less-prone to splitting than heavy-duty strapping, can also be improved by the addition of polyolefin co-polymers.

The resulting light-duty strapping exhibits resistance to splitting, increased tension retention, increased seal strength, and/or and maintenance of polyester's traditional color and translucence. In certain embodiments, light-duty strapping is prepared from polymer blends of polyester and polyolefin co-polymers, where the polyester has an intrinsic viscosity from between about 0.50 dl/g to about 0.70 dl/g, or from between about 0.70 dl/g to about 0.85 dl/g, or, for example, 0.50 dl/g, 0.55 dl/g, 0.60 dl/g, 0.65 dl/g, 0.70 dl/g, 0.71 dl/g, 0.72 dl/g, 0.73 dl/g, 0.74 dl/g, 0.75 dl/g, 0.76 dl/g, 0.77 dl/g, 0.78 dl/g, 0.79 dl/g, 0.80 dl/g, 0.81 dl/g, 0.82 dl/g, 0.83 dl/g, 0.84 dl/g, and 0.85 dl/g. In some embodiments, the article has an intrinsic viscosity about 0.60 dl/g to about 0.80 dl/g. In other embodiments, the article has an intrinsic viscosity about 0.65 dl/g to about 0.72 dl/g.

In certain embodiments, the above-described polymer blends of polyester and polyolefin co-polymers where the polyester has an intrinsic viscosity below 0.86 dl/g have been incorporated into either light-duty or heavy-duty strapping, where the polyester has been recycled or reprocessed.

In certain embodiments, the strapping is prepared from polyester and polyolefin, each of which independently has a moisture content of less than about 0.5%. In certain embodiments, each of the polyester and polyolefin independently has a moisture content of about 0.5% to about 0.1%. In certain embodiments, each of the polyester and polyolefin independently has a moisture content of about 0.1% to about 0.01%. In certain embodiments, each of the polyester and polyolefin independently has a moisture content of about 0.01% to about 0.001%.

The strapping may include additives, such as dyes and/or slip agents, that are believed to have minimal or no impact on the resistance to splitting, tension retention, or seal strength of the strapping.

In some embodiments, the strapping has a tensile strength of about 50,000 psi ($3.45 \times 10^8$ Pa) to about 60,000 psi ($4.14 \times 10^8$ Pa). In some embodiments, the strapping has a tensile strength of about 60,000 psi ($4.14 \times 10^8$ Pa) to 70,000 psi ($4.83 \times 10^8$ Pa). In some embodiments, the strapping has a tensile strength of about 70,000 psi ($4.83 \times 10^8$ Pa) to about 80,000 psi ($5.52 \times 10^8$ Pa). Tensile strengths are measured according to methods well known in the art such as those of ASTM D638.

Polyester-based strapping is commonly produced by forming continuous strips of polyester-based material using a extrusion die and molecularly orienting the strips in the longitudinal direction with stretching under heat and tension. Due to the molecular orientation, the strength of the strapping increases in the longitudinal direction but reduces at the lateral/transverse direction due to the necking and bending stress at the lateral direction. Thus, strapping that has been stretched in the longitudinal direction only has a greater tendency to split in the longitudinal direction when pulled tight, compared to unstretched strapping, or strapping stretched in two dimensions (i.e., both longitudinally and laterally).

Accordingly, in another aspect, the strapping compositions exhibit reduced brittleness, relative to existing compositions, rendering the strapping composition less apt to split at the lateral/transverse direction. In yet another aspect, the strapping compositions exhibit comparable brittleness, relative to existing compositions. In another aspect, the strapping compositions exhibit less opacity to visible light relative to existing compositions.

As indicated above, the strapping compositions are wrapped around objects (e.g., boxes or pallets, loaded with lumber or bricks) until the ends can be joined, drawn tight, and sealed. The resulting seal strength of the strapping compositions must withstand the heavy load of the wrapped objects without breaking Seal strength, as expressed herein, is determined by the load, in lbs, at which a ⅝"×0.035" strapping seal will break as a percentage of 1,300 lbs (591 kgs) of load. For example, the seal of a ⅝"×0.035" strapping that fails under 1069 lbs (486 kgs) of load has a seal strength of 82% (1069/1300×100). One of ordinary skill in the art can calculate seal strengths for different sized straps, under different loads, other than a ⅝"×0.035" strap. In certain embodiments, the seal strength of the strapping composition is about 80% to about 85%. In certain embodiments, the seal strength of the strapping composition is about 85% to about 90%. In certain embodiments, the seal strength of the strapping compositions is about 88% to about 92%. In certain embodiments, the seal strength of the strapping compositions is about 88% to about 99%. In certain embodiments, the seal strength of the strapping compositions is about 90% to about 95%. In certain embodiments, the seal strength of the strapping compositions is about 95% to about 99%.

The strapping compositions can be sealed according to methods well-known in the art. For example, such methods are described in U.S. Pat. Nos. 7,625,628, 6,210,769, and 5,525,391, the entirety of each of which is incorporated herein by reference. For example, hot-seal welding or friction welding can be used to weld the outer surfaces of the strapping together. Hot-seal welding employs a seal heater blade at elevated temperature to weld the outer surfaces of the strapping. Friction welding uses a rapid oscillating mechanism to generate heat and thereby weld the outer surfaces of the strapping. For example, in one aspect, the two ends of a strapping are wrapped around an object to be packaged, overlapped and pulled tight. The outer surface of overlapping layers are either hot-seal welded or friction welded together, and the excess strapping is cut. Seal strength of the welded ends is generally proportional to the wt % of polyolefin co-polymers that is blended with polyester prior to extrusion of the strapping composition. In certain embodiments, the strapping compositions, having lower viscosities, can attain greater wt % of polyolefin co-polymers without hindering the extrusion process. Thus, these strapping compositions having greater wt % of polyolefin co-polymers can likewise exhibit sufficient seal strengths.

In certain embodiments, the strapping composition includes polyester with an intrinsic viscosity of between about 0.70 dl/g and about 0.84 dl/g, and a seal strength of between about 80% and about 95%. In certain embodiments, the strapping composition includes polyester with an intrinsic viscosity of between about 0.75 dl/g and about 0.82 dl/g, and a seal strength of between about 80% and about 95%.

In some embodiments, the article has an intrinsic viscosity of about 0.60 dl/g to about 0.80 dl/g. In some embodiments, the article has an intrinsic viscosity of about 0.65 dl/g to about 0.72 dl/g.

In certain embodiments, any of the above-described strapping compositions has about 1.0 wt % to about 1.5 wt % polyolefin co-polymers. In certain embodiments, any of the strapping compositions has about 1.5 wt % to about 2.0 wt % polyolefin co-polymers and a seal strength of at least about 80%. In certain embodiments, any of the above-described strapping compositions has about 2.0 wt % to about 2.5 wt % polyolefin co-polymers. In certain embodiments, any of the above-described strapping compositions has about 2.5 wt % to about 3.0 wt % polyolefin co-polymers. In certain embodiments, any of the above-described strapping compositions has about 3.0 wt % to about 3.5 wt % polyolefin co-polymers. In certain embodiments, any of the above-described strapping compositions has about 3.5 wt % to about 4.0 wt % polyolefin co-polymers. In certain embodiments, any of the above-described strapping compositions has about 4.0 wt % to about 4.5 wt % polyolefin co-polymers.

Hot seal welding of the seals of the strapping compositions can be conducted at lower temperatures and over shorter welding times, relative to conditions necessary to weld the seals of existing strapping compositions. In certain embodiments, the ends of the strapping compositions can be hot seal welded at seal heater blade temperatures of about 600° F. (316° C.) to about 975° F. (524° C.). In other embodiments, the ends of the strapping compositions can be hot seal welded at seal heater blade temperatures of about 750° F. (399° C.) to about 900° F. (482° C.). In certain embodiments, the time required to hot seal weld the ends of the strapping compositions is between about 0.05 seconds and about 1 second. In certain embodiments, the time required to hot seal weld the ends of the strapping compositions is between about 0.25 seconds and about 0.55 seconds. Consequently, the strapping compositions can be manufactured in less time and at lower cost.

Stress relaxation is the extent to which a strapping composition loses an initial tension over a period of time. For example, a strapping composition having an applied stress of 75,000 psi for 1,000 hours may exhibit essentially no stress relaxation, by retaining 100% of its initial tension, or it may exhibit some degree of stress relaxation, by retaining less than 100% of its initial tension. In another aspect, the strapping composition exhibits a minimal and acceptable degree of stress relaxation, where the strapping includes about 0.15 wt % to about 4.5 wt % of a polyolefin co-polymer, where the polyolefin co-polymer includes about 26 wt % to about 90 wt % polypropylene, and about 10 wt % to about 74 wt % of a polyolefin other than polypropylene, where the polyolefin co-polymer optionally further includes a diene. In certain embodiments, a strapping composition may concede a minimal degree of stress relaxation in order to impart sufficient tension retention.

Some loads require strapping to have good initial tension as well as retained tension which keeps the strapping tight around the load even if the package settles and shrinks in size. The strapping compositions have sufficient tension retention. In some embodiments, the strapping compositions have tension retention of about 70% to about 99%. In some embodiments, the strapping compositions have tension retention of about 70% to about 75%. In some embodiments, the strapping compositions have tension retention of about 75% to about 80%. In some embodiments, the strapping compositions have tension retention of about 80% to about 95%. In some embodiments, the strapping compositions have tension retention of about 95% to about 99%. It is believed that the high wt % of polyolefin co-polymers may contribute to high degree of tension retention of the strapping compositions.

In another aspect, the strapping has a continuous rectangular cross section, where the strapping has a width of about 0.30 inches (0.80 cm) to about 2.75 inches (7.00 cm) and a thickness of about 0.015 inches (0.05 cm) to about 0.10 inches (0.3 cm). In some embodiments the strapping has a width of about ⅜ inches (10 mm) to about 7/16 inches (11 mm). In some embodiments the strapping has a width about 11 mm to about 12 mm. In some embodiments the strapping has a width about ½ inches (12 mm) to about 9/16 inches (14 mm). In some embodiments the strapping has a width of about 9/16 inches (14 mm) to about ⅝ inches (16 mm). In some embodiments the strapping has a width of about ⅝ inches (16 mm) to about ¾ inches (19 mm). In some embodiments the strapping has a width of about ¾ inches (19 mm) to about 1¼ inches (32 mm). In some embodiments the strapping has a width of about 1¼ inches (32 mm) to about 2½ inches (64 mm). In some embodiments the strapping has a width of about 1 inch to about 1¾ inches.

In certain embodiments, the strapping has a thickness of about 0.018 inches (0.46 mm) to about 0.050 inches (1.27 mm). In some embodiments, the strapping has a thickness of about 0.018 inches (0.46 mm) to about 0.020 inches (0.51 mm). In some embodiments the strapping has a thickness of about 0.020 inches (0.51 mm) to about 0.024 inches (0.61 mm). In some embodiments the strapping has a thickness of about 0.024 inches (0.61 mm) to about 0.030 inches (0.76 mm). In some embodiments the strapping has a thickness of about 0.030 inches (0.76 mm) to about 0.035 inches (0.89 mm). In other embodiments, the strapping has a thickness of about 0.035 inches (0.89 mm) to about 0.040 inches (1.02 mm). In other embodiments, the strapping has a thickness of about 0.040 inches (1.02 mm) to about 0.050 inches (1.27 mm).

As described above, a further advantage of the strapping is that, in certain embodiments, it is less likely to damage goods, such as lumber, which the strapping is designed to combine or fasten. Commonly, existing strapping must be fitted with "bumpers" that prevent the edges, or split edges, of the tightly wrapped strapping from digging into fastened goods such as lumber. The strapping, particularly the heavy-duty strapping having a width of at least ⅝ inches (15 mm) or, alternatively, exhibiting a break strength of at least about 1,300 lbs (591 kgs) of load, combines or fastens items with minimal splitting and without digging into them as much as existing strapping, thus reducing or dispensing with the need for bumpers.

The strapping compositions can be made according to methods well-known in the art. For example, such methods and the equipment used to make strapping are described in U.S. Pat. Nos. 7,625,628, 6,210,769, and 5,525,391.

In another aspect, a method for manufacturing an article is provided, where the article is a strapping, including the steps of forming a mixture, heating the mixture, and extruding the heated mixture to form the strapping. The mixture includes about 85.5 wt % to about 99.85 wt % of a polyester and about 0.15 wt % to about 4.5 wt % of a polyolefin co-polymer, where the polyolefin co-polymer is polymerized from monomers including about 10 wt % to about 90 wt % of propylene or one or more (meth)acrylates, and about 10 wt % to about 90 wt % of an olefin other than propylene or a (meth)acrylate.

In some embodiments, the method for manufacturing polyester-based strapping compositions utilize polyolefin co-polymers that derive, in part, from propylene. In one embodiment, the polyolefin co-polymer is polymerized from monomers including about 26 wt % to about 90 wt % propylene and about 10 wt % to about 74 wt % of the olefin other than propylene or a (meth)acrylate. In some embodiments, the polyolefin co-polymer is polymerized from monomers consisting essentially of: about 26 wt % to about 39 wt % propylene; and about 61 wt % to about 74 wt % of the olefin other than propylene or a (meth)acrylate.

In some embodiments, the method for manufacturing polyester-based strapping compositions utilize polyolefin co-polymers that further include a diene constituent. In some embodiments, the olefin other than propylene or a (meth)acrylate of the polyolefin co-polymer includes a diene. In certain embodiments, the diene constituent includes ethylidenenorbornene (ENB).

In some embodiments, the method for manufacturing polyester-based strapping compositions utilize polyolefin co-polymers that are polymerized from monomers consisting essentially of about 26 wt % to about 39 wt % propylene, about 61 wt % to about 74 wt % of the olefin other than propylene or a (meth)acrylate, and about 0.1 wt % to about 10 wt % of a diene. In some embodiments, the polyolefin co-polymer is polymerized from monomers including about 27 wt % to about 31 wt % propylene, about 68 wt % to about 73 wt % of the olefin other than propylene or a (meth)acrylate, and about 0.1 wt % to about 5 wt % of the diene. In some embodiments, the polyolefin co-polymer is polymerized from monomers including about 29 wt % propylene, about 70.5 wt % of the olefin other than propylene or a (meth)acrylate, and about 0.5 wt % of the diene.

In some embodiments, the method for manufacturing polyester-based strapping compositions utilize polyolefin co-polymers that derive, in part, from one or more (meth)acrylates. In some embodiments, the polyolefin co-polymer is polymerized from monomers including about 10 wt % to about 50 wt % of one or more (meth)acrylates and about 50 wt % to about 90 wt % of the olefin other than propylene or a (meth)acrylate. In some embodiments, the polyolefin co-polymer is polymerized from monomers consisting essentially of: about 10 wt % to about 50 wt % of one or more (meth)acrylates and about 50 wt % to about 90 wt % of the olefin other than propylene or a (meth)acrylate.

In some embodiments, the method for manufacturing polyester-based strapping compositions utilize polyolefin co-polymers that are polymerized from monomers including about 15 wt % to about 40 wt % of one or more (meth)acrylates and about 60 wt % to about 85 wt % ethylene. In some embodiments, the polyolefin co-polymer is polymerized from monomers including about 10 wt % to about 20 wt % of one or more (meth)acrylates and about 80 wt % to about 90 wt % ethylene. In some embodiments, the polyolefin co-polymer is polymerized from monomers including about 21 wt % to about 30 wt % of one or more (meth)acrylates and about 70 wt % to about 79 wt % ethylene. In some embodiments, the polyolefin co-polymer is polymerized from monomers including about 31 wt % to about 40 wt % of one or more (meth)acrylates and about 60 wt % to about 69 wt % ethylene. In certain embodiments, the polyolefin co-polymer is polymerized from monomers including about 41 wt % to about 50 wt % of one or more (meth)acrylates and about 50 wt % to about 59 wt % ethylene.

In some embodiments, the method for manufacturing polyester-based strapping compositions utilize polyolefin co-polymers that are polymerized from (meth)acrylates, and the (meth)acrylates include butyl acrylate, methyl acrylate, glycidyl (meth)acrylate, methyl (meth)acrylate, or a combination of any two or more thereof. In some embodiments, the (meth)acrylates include butyl acrylate. In some embodiments, the (meth)acrylates include methyl acrylate.

In yet another aspect, a method for manufacturing an article is provided, where the article is a strapping, including the steps of forming a mixture, heating the mixture, and extruding the heated mixture to form the strapping. The mixture includes about 85.5 wt % to about 99.85 wt % of a polyester and about 0.15 wt % to about 4.5 wt % of a polyolefin co-polymer. The polyolefin co-polymer is polymerized from monomers including about 10 wt % to about 90 wt % of propylene or one or more (meth)acrylates, about 10 wt % to about 90 wt % of an olefin other than propylene or a (meth)acrylate, and where the article optionally includes about 0.01 wt % to about 10 wt % of a polyamide or a polycarbonate. In some embodiments, the article includes a polyamide, and where the polyamide includes nylon.

In yet another aspect, a method for manufacturing a polyester-based strapping is provided, where the polyester has an intrinsic viscosity of about 0.70 dl/g to about 0.84 dl/g. In certain embodiments, the polyester has an intrinsic viscosity of about 0.78 dl/g to about 0.82 dl/g. In some embodiments, the polyester and polyolefin co-polymer each, independently, has an intrinsic viscosity of about 0.70 dl/g to about 0.82 dl/g. In some embodiments, the polyester and polyolefin co-polymer have a combined intrinsic viscosity of about 0.70 dl/g to about 0.82 dl/g.

In certain embodiments, the method for manufacturing a polyester-based strapping composition utilizes, in part, polyethylene terephthalate. In other embodiments, the method further adds polyamide, such as nylon, to the strapping composition. In other embodiments, the polyamide is absent from the strapping composition.

In certain embodiments, the method for manufacturing a polyester-based strapping composition utilizes, in part, about 1.25 wt % to about 3.0 wt % of the polyolefin co-polymer. In certain embodiments, the method utilizes one or more olefins other than propylene such as ethylene.

Prior to being extruded the precursor the polyester, polyolefin co-polymer, and optional polyamide and/or polycarbonate are mixed in the extruder and melted at a temperature range of about 200° C. to about 340° C. to render the molten mixture flowable. In certain embodiments, the polyester, polyolefin co-polymer, and optional polyamide and/or polycarbonate are melted at a temperature range of about 280° C. to about 310° C.

The molten mixture of polyester, polyolefin co-polymer, and optional polyamide and/or polycarbonate are then forced through a die which yields straps or sheets of a substantially rectangular cross section of extruded material. The extruded material may be a single strand, multiple strands, or a sheet intended to be subsequently cut into individual straps.

In certain embodiments, the extruder is a single screw extruder. In further embodiments, the extruder is a twin screw extruder. An unexpected advantage of the strapping is that it can be conveniently produced using a single screw extruder, whereas some conventional strapping compositions must be produced using a twin screw extruder in order to achieve sufficient mixing of the components.

Stretching in the longitudinal direction strengthens the strapping due to alignment of the polyester molecules along the longitudinal direction of the strapping. As noted above, polyester-based strapping is commonly produced by forming continuous strips of polyester-based material using a extrusion die and molecularly orienting the strips in the longitudinal direction with stretching under heat and tension. Generally, the strength of the strapping increases in the longitudinal direction. In certain embodiments, the strapping is stretched in the longitudinal direction of the strapping about 3 to about 7 times an initial, unstretched length of the strapping. The strapping compositions can be stretched according to methods well-known in the art. For example, such methods are described in U.S. Pat. Nos. 7,625,628, 6,210,769, and 5,525,391.

Prior to stretching the precursor strapping is heated to a temperature range between the softening point and the melting point of the strapping. In certain embodiments, the strapping compositions are more readily stretched due, in part, to greater percentages of polyolefin co-polymers that are blended with polyester prior to extrusion of the precursor strapping composition. In certain embodiments, the strapping compositions are stretched at lower temperatures than temperatures required to stretch conventional strapping compositions. In certain embodiments, the strapping compositions are stretched at temperatures of about 110° C. to about 130° C. In certain embodiments, the strapping compositions are stretched at temperatures of about 130° C. to about 150° C. In certain embodiments, the strapping compositions are stretched at temperatures of about 150° C. to about 170° C. In certain embodiments, the strapping compositions are stretched at temperatures of about 170° C. to about 190° C. In certain embodiments, the strapping compositions are stretched at temperatures of about 190° C. to about 210° C.

One skilled in the art will readily realize that all ranges discussed can and do necessarily also describe all subranges therein for all purposes and that all such subranges also form part and parcel of this disclosure. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present aspects and embodiments, thus generally described, will be understood more readily by reference to the following examples, which are provided by way of illustration and are not intended to be limiting.

EXAMPLES

The following terms and abbreviations are used: "SS" is seal strength, which is calculated as seal strength (lbs)/1300 (lbs)×100. "TR" is tension retention after 24 hours by placing the strapping under a load and measuring tension at an initial time point and re-measuring 24-hours later. The tension value at 24-hours is divided by the value at the initial time point and multiplied by 100. "PET IV" is the intrinsic viscosity of the polyethylene terephthalate (PET) component of the polymer mixture, before processing the mixture through the extruder to make the strapping. "Strap IV" is the intrinsic viscosity of the polymer blend used to make the strapping. Additive "Y" is a polyolefin co-polymer polymerized about 91 wt % propylene and 9 wt % ethylene. Additive "Z" is a polyolefin co-polymer polymerized from 29 wt % propylene, 70.5 wt % ethylene, and 0.5 wt % ethylidenenorbornene (ENB). Additive "YY" is a copolymer made about 65% ethylene and about 35% butyl acrylate. Additive "ZZ" is a copolymer made about 68% ethylene, about 24% methyl acrylate and about 8% glycidyl methacrylate. The term "n.t." means "not tested." "Additive %" indicates wt %, "MFI" is melt flow index, "Ave" is average, and "S.D." is standard deviation. "CT" is "clear/transparent" and "MC" is "milky/cloudy."

Example 1

Seal efficiencies, tension retention and split resistance test results for strappings made from co-polymers derived from ethylene and propylene monomers are depicted in Table 5. "VK-30 & MHT80 Split Testing" were conducted to measure the resistance to splitting of strapping compositions with the dimensions ⅝"×0.035". This procedure utilized a VK-30 Titan sealing head, or a MHT80 Signode head to place the strapping under simulated high tensions of 280 lbs to 340 lbs, similar to those of lumber or brick applications. Tension was applied to strapping at both ends of the seal, which was held approximately 1" to 3" from a metal plate. Tension was then released, allowing the strapping seal to slap against a metal plate which can cause longitudinal splitting along the strapping nearest to the seal. The strapping was then removed from "roll guides" of the VK30 Titan sealing head and inspected for splitting.

Splitting results are depicted in FIG. 2. Specifically, strapping compositions D1-D5 exhibited less than or equal to 50% splitting under simulated high tensions of 280 lbs to 340 lbs Further, none of strapping compositions D1-D5 exhibited splitting under 280 lbs of simulated tension. Thus, compositions D1-D5 exhibited reduced splitting relative to the polyester strapping composition A and polyester-silicone composition B.

The strapping of compositions D1-D5 exhibited translucence to visible light comparable to conventional PET strapping having no polyolefin co-polymer additive. The strapping of compositions D1-D5 also exhibited greater translucence to visible light compared to PET strapping C having a polyolefin co-polymer additive polymerized about 91% propylene and about 9% ethylene.

TABLE 5

Split Testing Results of Strappings Made From Co-Polymers Derived From Ethylene and Propylene Monomers.

| | Strap Properties | Individual Strapping (⅝" × .035") | | | | | | | |
|---|---|---|---|---|---|---|---|---|---|
| | | A | B | C | D1 | D2 | D3 | D4 | D5 |
| Composition | PET IV | 0.81 | 0.86 | 0.81 | 0.81 | 0.81 | 0.81 | 0.81 | 0.81 |
| | Additive | None | Silicone | Y | Z | Z | Z | Z | Z |
| | Additive MFI | — | — | — | 0.49 | 0.49 | 0.49 | 0.49 | 0.49 |
| | Additive % | 0 | 0.375 | 1.25 | 0.875 | 1.25 | 1.5 | 1.75 | 2 |
| Splitting | 280 lbs | 3/5 | 2/7 | 0/6 | 0/6 | 0/6 | 0/6 | 0/6 | 0/6 |
| | 300 lbs | 5/6 | 6/6 | 2/7 | 2/6 | 2/6 | 0/6 | 1/7 | 2/7 |
| | 320 lbs | 5/5 | 6/6 | 3/6 | 4/6 | 4/6 | 3/6 | 4/6 | 4/6 |
| | 340 lbs | 6/6 | 5/6 | 3/6 | 4/6 | 6/6 | 5/6 | 5/6 | 3/6 |
| | Split % | 83 | 79 | 32 | 42 | 50 | 33 | 40 | 36 |
| Seal Strength | Seals made on a VK-30 head (lbs) | 1069 | 1223 | 1188 | 1174 | 1202 | 1206 | 1165 | 1178 |
| | SS % | 82 | 94 | 91 | 90 | 92 | 93 | 90 | 91 |
| | Seals made on a MHT80 Signode head (lbs) | 1139 | 1278 | 1201 | 1168 | 1172 | 1160 | 1173 | 1195 |
| | SS % | 88 | 98 | 92 | 90 | 90 | 89 | 90 | 92 |
| Tension Retention | TR % | 68 | n.t. | 73 | n.t. | 72 | 70 | 73 | 73 |

Additive YY is a copolymer made about 65% ethylene and about 35% butyl acrylate. Additive ZZ is a copolymer made about 68% ethylene, about 24% methyl acrylate and about 8% glycidyl methacrylate.

Example 2

The melt flow index "MFI" molten extrusion rate (in g/10 min) for Additive Z was determined through a standard die (2.095×8 mm, at 230° C., under 2.16 kg of load) in accordance with the methods described under American Society for Testing (ASTM) D1238.

TABLE 6

Melt Flow Index values for Additive Z:

| MFI (g/10 min) | Ave. | S.D. |
|---|---|---|
| 0.49 | 0.49 | 0.01 |
| 0.50 | | |
| 0.49 | | |

TABLE 7

Split Testing Results of Strappings Made From Co-Polymers Derived From Ethylene and Acrylate Monomers.

| | Strap Properties | Individual Strapping (⅝" × .035") | | | | | | |
|---|---|---|---|---|---|---|---|---|
| | | E | F | G1 | G2 | H | I1 | I2 |
| Composition | PET IV | 0.80 | 0.80 | 0.80 | 0.80 | 0.80 | 0.80 | 0.80 |
| | Strap IV | 0.703 | 0.659 | 0.68 | 0.68 | 0.705 | 0.706 | 0.694 |
| | Additive | None | Silicone | YY | YY | Silicone | ZZ | ZZ |
| | Additive (%) | 0 | 1.75 | 1 | 1.75 | 1.75 | 1 | 2 |
| | Width (in.) | 0.613 | 0.603 | 0.604 | 0.609 | 0.615 | 0.608 | 0.615 |
| | Gauge (in.) | 0.347 | 0.350 | 0.349 | 0.350 | 0.350 | 0.350 | 0.350 |
| | Weight (g/ft) | 6 | 5.42 | 5.42 | 5.49 | 5.55 | 5.49 | 5.5 |
| | L* | 45.3 | 48 | 47.7 | 53.4 | 48.4 | 42.2 | 46.2 |
| Splitting | Break (lbs.) | 1449 | 1406 | 1429 | 1423 | 1406 | 1515 | 1461 |
| | Eb (%) | 11.2 | 10.6 | 10.6 | 10.6 | 11.5 | 11.6 | 12.3 |
| | STD Split Test | 0/10 | 0/10 | 0/10 | 0/10 | 0/10 | 0/10 | 0/10 |
| | 280 lbs | 3/5 | 0/5 | 0/5 | 1/9 | 3/13 | 3/10 | 0/8 |
| | 300 lbs | 4/6 | 1/6 | 2/5 | 0/5 | 1/6 | 5/5 | 4/8 |
| | 320 lbs | 4/6 | 3/6 | 2/6 | 1/5 | 3/6 | 4/6 | 5/6 |
| | 340 lbs | 5/5 | 4/6 | 3/6 | 1/6 | 6/6 | 4/6 | 5/6 |
| | Split % | 73 | 35 | 32 | 12 | 42 | 59 | 41 |
| Seal Strength | Seals made on a VK-30 head (lbs.) | 1101 | 1216 | 1259 | 1223 | 1120 | 1204 | 1253 |
| | SE (%) | 85 | 94 | 97 | 94 | 86 | 93 | 96 |
| | Seals made on a MHT80 Signode head (lbs) | 1129 | 1197 | 1243 | 1209 | 1191 | 1230 | 1215 |
| | SE (%) | 87 | 92 | 96 | 93 | 92 | 95 | 93 |
| Tension Retention | 24-Hr TR (%) | 72 | 71 | 74 | 76 | 72 | 70 | 73 |

L* is a relative measure of coloration as measured by a spectrophotometer.
Eb % is the extent of elongation that occurs prior to breakage.
The STD split test attempts to split the strapping by subjecting the strapping to longitudinal folding with pliers or a test instrument.

Example 3

Seal efficiencies, tension retention and split resistance test results for strappings made from co-polymers derived from ethylene and acrylate monomers are depicted in Table 7. Specifically, strapping compositions that include additive 1.75% YY (a copolymer made about 65% ethylene and about 35% butyl acrylate) yielded improved split resistance over the control product containing 1.75% Z. The occurrence of splits, using the VK30 test with contact plate, was reduced by 66% for tests run at 280 lbs to 340 lbs applied tension. At the 1% level, additive YY improved split resistance by about 9% over the control product. Strapping compositions that include additive YY exhibited fewer splitting frequencies relative to control strappings subjected to simulated high tensions of 280 lbs to 340 lbs. Further, none of strapping compositions that include additive YY exhibited splitting at 280 lbs of simulated tension. Thus, compositions that include additive YY exhibited reduced splitting relative to the polyester strapping composition E and the polyester-silicone composition F.

Split resistance of compositions that include 1% of additive YY (32%) was better than the control products (35% and 42%) containing 1.75% Z si one. MHT80 and VK30 seal efficiencies were similar to EPDM at the higher addition rate. Seal efficiencies and tension retentions also improved for compositions that include 1% of additive YY relative to control products lacking an additive or containing 1.75% Z.

While certain embodiments have been illustrated and described, it should be understood that changes and modifications can be made therein in accordance with ordinary skill in the art without departing from the invention in its broader aspects as defined in the following claims.

What is claimed is:

1. An article comprising:
   a polymer blend comprising:
      about 85.5 wt % to about 99.85 wt % of a polyester;
      about 0.15 wt % to about 4.5 wt % of a polyolefin co-polymer;
      optionally about 0.01 wt % to about 10 wt % of a polyamide or a polycarbonate; and
      optionally a (meth)acrylate selected from the group consisting of butyl acrylate, methyl acrylate, glycidyl (meth)acrylate, methyl (meth)acrylate, and a combination of any two or more thereof;
   wherein:
      the polyester has an intrinsic viscosity of 0.83 dl/g, 0.84 dl/g, or 0.85 dl/g;
      the polyester is selected from the group consisting of polyethylene terephthalate, polypropylene terephthalate, polybutylene terephthalate, polytetramethylene terephthalate, polycyclohexanedimethylene terephthalate, polyethylene naphthalate, polybutylene naphthalate, polyethylene isophthalate, and a combination of any two or more thereof; and
      the polyolefin co-polymer is polymerized from monomers comprising:
         about 26 wt % to about 90 wt % propylene; and
         about 10 wt % to about 74 wt % of the olefin other than propylene
      wherein the article is a strapping article free of polyethylene, polypropylene, or mixtures thereof.

2. The article of claim 1, wherein: the article includes the about 0.01 wt % to about 10 wt % of the polyamide or polycarbonate.

3. The article of claim 1, wherein the article includes the polyamide, and wherein the polyamide is nylon.

4. The article of claim 1, wherein the olefin other than propylene is present about 30 wt % to about 60 wt %.

5. The article of claim 1, wherein the olefin other than propylene is present from 61 wt % to 74 wt %.

6. The article of claim 1, wherein the polyolefin co-polymer is polymerized from monomers consisting of:
   about 26 wt % to about 39 wt % propylene; and
   about 61 wt % to about 74 wt % of the olefin other than propylene.

7. The article of claim 1, wherein the polyolefin co-polymer is polymerized from monomers consisting of:
   about 26 wt % to about 39 wt % propylene;
   about 61 wt % to about 74 wt % of the olefin other than propylene; and
   about 0.1 wt % to about 10 wt % of a diene.

8. The article of claim 1, wherein the one or more olefins other than propylene is a diene.

9. The article of claim 8, wherein the diene is ethylidene norbornene (ENB), norbornadiene, oxanorbornadiene, dicyclopentadiene, or a 1,3-diene.

10. The article of claim 1, wherein the olefin other than propylene is ethylene.

11. A method of manufacturing a strapping article, the method comprising:
   forming a mixture comprising:
      about 85.5 wt % to about 99.85 wt % of a polyester;
      about 0.15 wt % to about 4.5 wt % of a polyolefin co-polymer;
      optionally about 0.01 wt % to about 10 wt % of a polyamide or a polycarbonate; and
      optionally a (meth)acrylate selected from the group consisting of butyl acrylate, methyl acrylate, glycidyl (meth)acrylate, methyl (meth)acrylate, and a combination of any two or more thereof;
   heating the mixture; and
   extruding the heated mixture to form the strapping article;
   wherein:
      the polyester has an intrinsic viscosity of 0.83 dl/g, 0.84 dl/g, or 0.85 dl/g;
      the mixture is free of polyethylene, polypropylene, or mixtures thereof;
      the polyester is selected from the group consisting of polyethylene terephthalate, polypropylene terephthalate, polybutylene terephthalate, polytetramethylene terephthalate, polycyclohexanedimethylene terephthalate, polyethylene naphthalate, polybutylene naphthalate, polyethylene isophthalate, and a combination of any two or more thereof; and
      the polyolefin co-polymer is polymerized from monomers comprising:
         about 10 wt % to about 90 wt % of propylene; and
         about 10 wt % to about 90 wt % of an olefin other than propylene.

12. The method of claim 11, wherein the strapping article comprises the polyamide, and wherein the polyamide is nylon.

13. The method of claim 11, wherein the polyolefin co-polymer is polymerized from
   about 26 wt % to about 90 wt % propylene; and
   about 10 wt % to about 74 wt % of the olefin other than propylene.

* * * * *